UNITED STATES PATENT OFFICE.

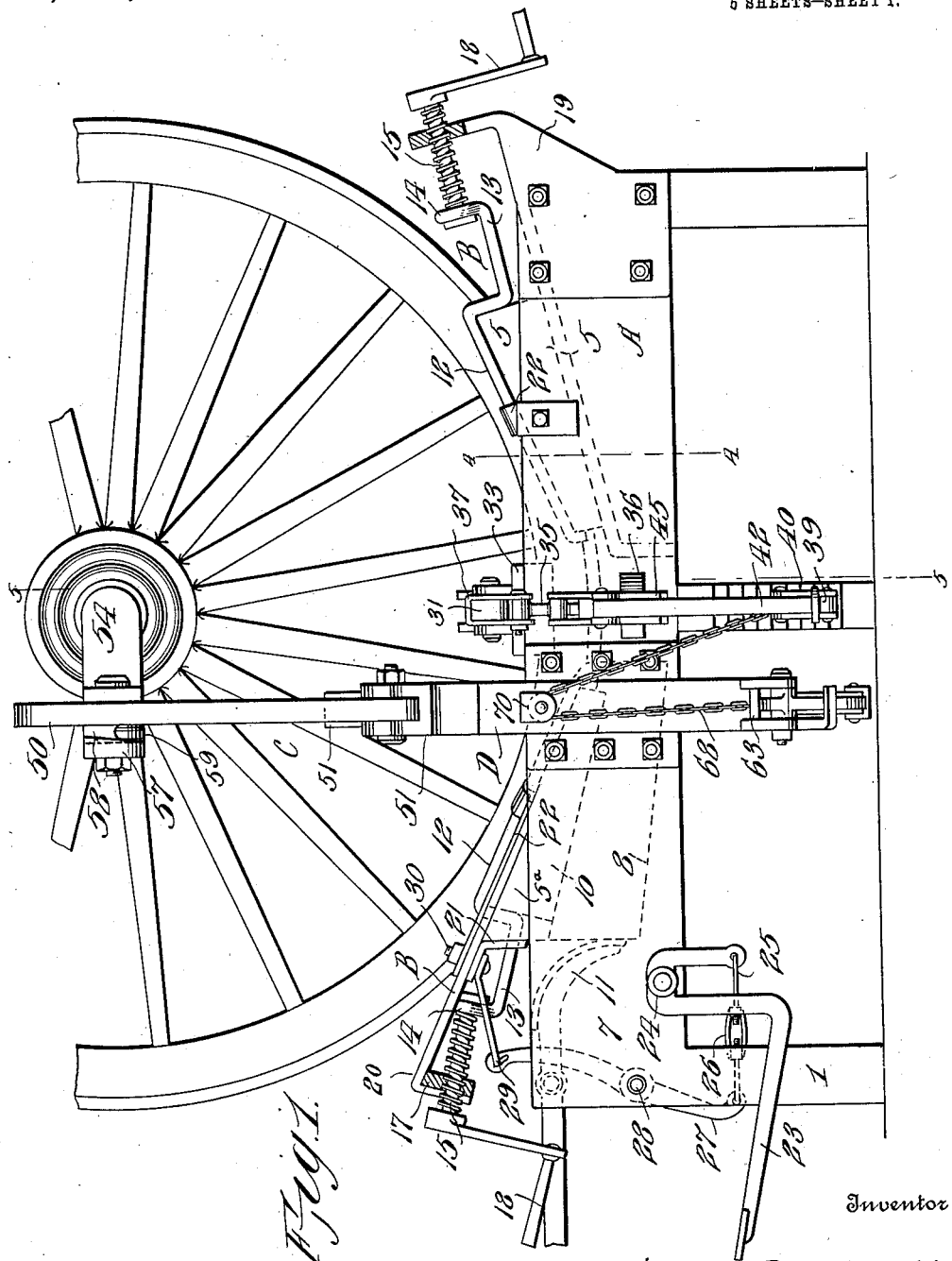

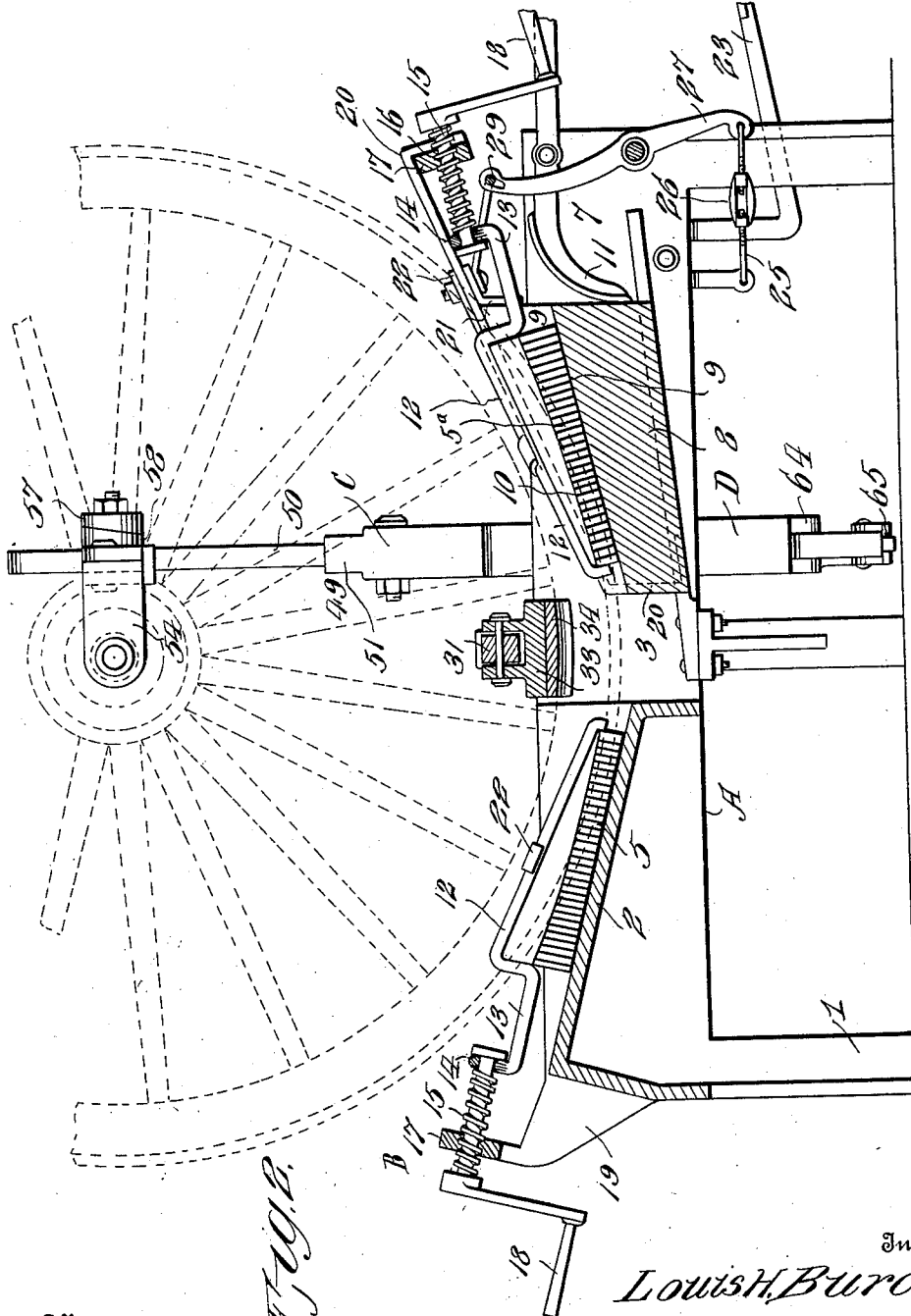

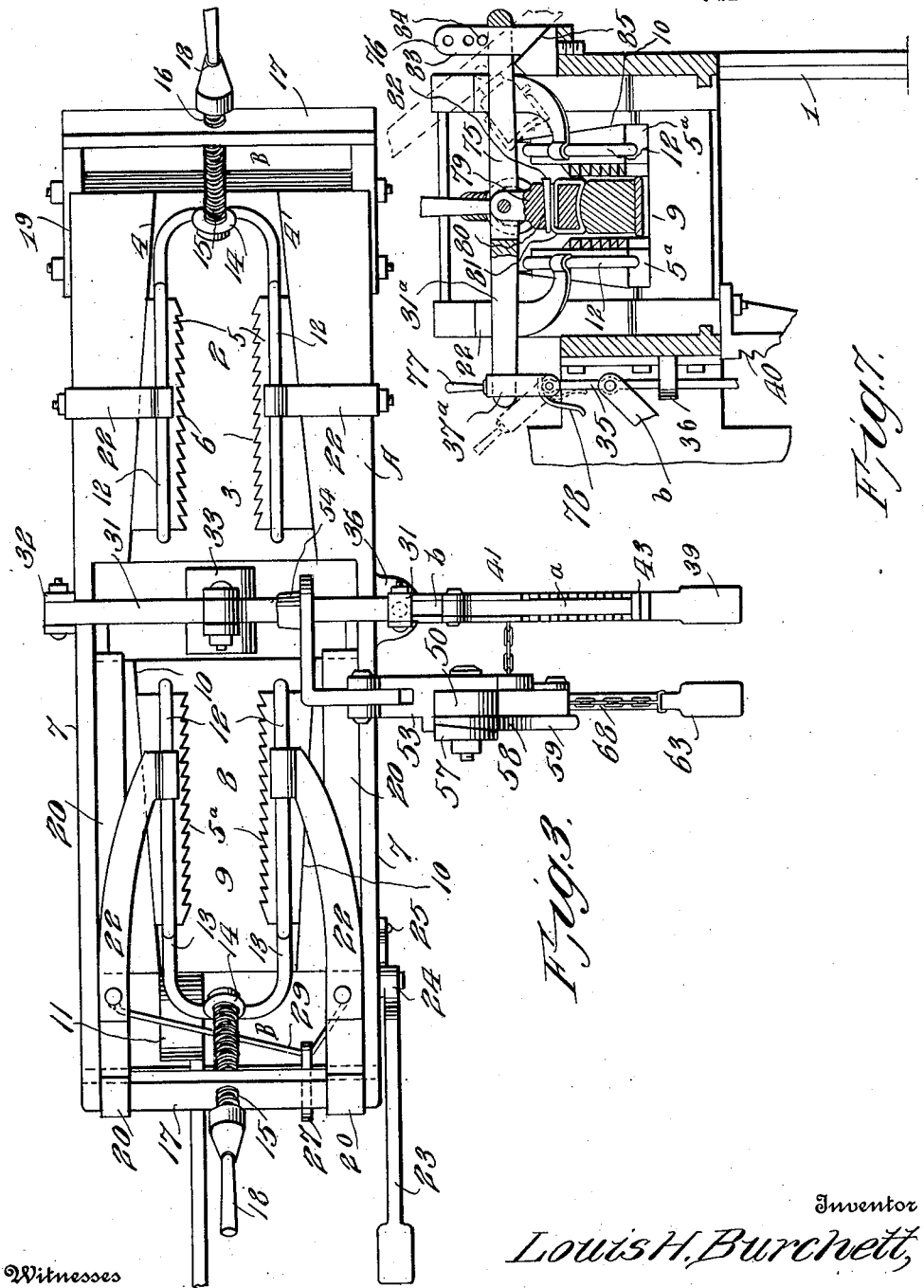

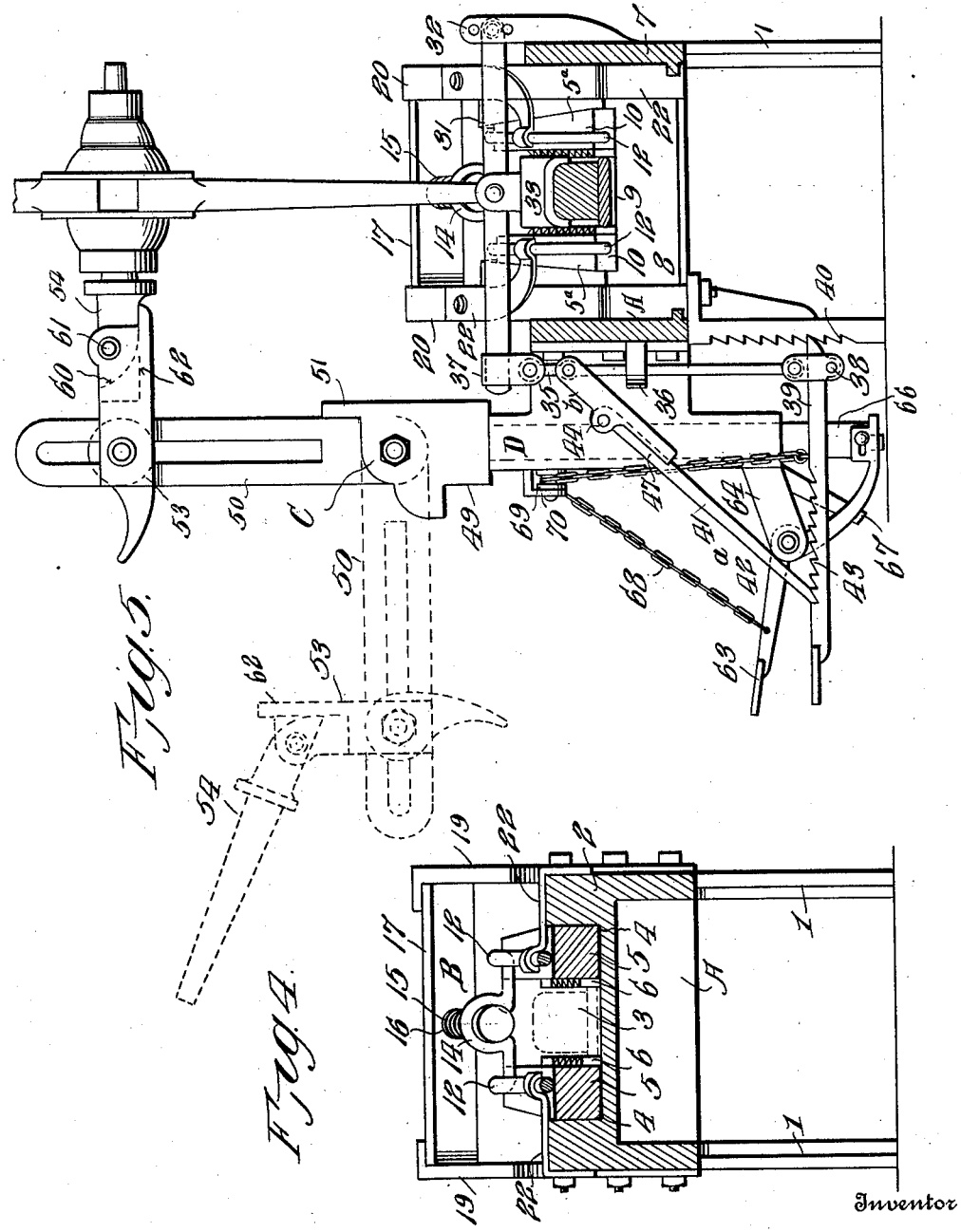

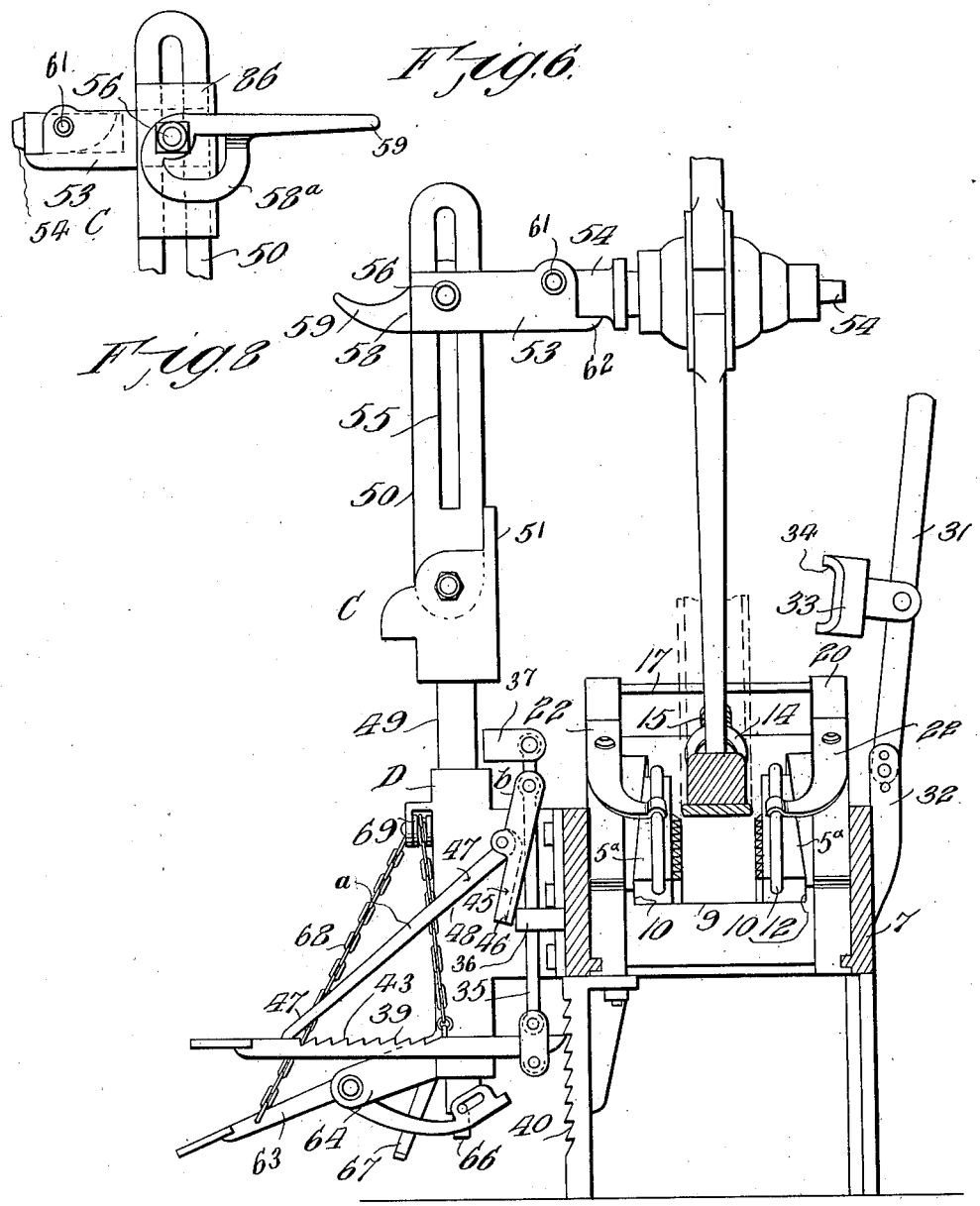

LOUIS H. BURCHETT, OF CASHION, OKLAHOMA.

WHEEL-HOLDING ATTACHMENT FOR TIRE-SHRINKING MACHINES.

1,091,285.  Specification of Letters Patent.  Patented Mar. 24, 1914.

Application filed September 24, 1910. Serial No. 583,634.

*To all whom it may concern:*

Be it known that I, LOUIS H. BURCHETT, a citizen of the United States, residing at Cashion, in the county of Kingfisher and State of Oklahoma, have invented new and useful Improvements in Wheel-Holding Attachments for Tire-Shrinking Machines, of which the following is a specification.

This invention relates to tire shrinking machines of that type including fixed movable heads having tire-gripping devices such as serrated wedges or keys which cause the tire to be upset by the relative movement of the heads toward each other.

The invention has for one of its objects the provision of a wheel-holding device which can be thrown outwardly to one side of the machine where it will permit a wheel to be conveniently moved from or placed thereon and can be thrown inwardly to carry the wheel over the machine and support it in coöperative relation with the wedges.

Another object of the invention is the use, in connection with the wheel holder, of means for adjusting the device that clamps the wheel on the stationary head of the machine.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a side elevation of the machine. Fig. 2 is a central longitudinal section thereof. Fig. 3 is a plan view of the machine. Fig. 4 is a transverse section on line 4—4, Fig. 1, looking to the right. Fig. 5 is a transverse section on line 5—5, Fig. 1, looking to the left and showing the wheel-holding device by full lines in a position for supporting a wheel, and by dotted lines in open position. Fig. 6 is a view similar to Fig. 5 showing the wheel-holding device raised by the depression of the treadle. Fig. 7 is a detail sectional view of the machine similar to sectional Fig. 5, showing a modified form of wheel-clamping device. Fig. 8 is a fragmentary view of a modified form of wheel-supporting device.

Similar reference characters are employed to designate corresponding parts throughout the views.

Referring to the drawings, A designates the body or frame of the machine, which is supported on legs 1, and at one end of the machine is formed a stationary head 2 that has its top surface formed with a recess 3 for receiving a wheel and for holding tire-gripping devices, the opposed walls 4 of the said recess being converged in an outward direction. Slidably mounted in the recess 3 are wedges or keys 5 that have tire-gripping serrations 6. The portion of the frame to the left (Figs. 1 and 3) of the stationary head 2 is formed of parallel plates 7 that constitute guides for the movable or sliding head 8. This head has a recess 9 in its top surface, and the opposed walls 10 thereof converge oppositely to the walls 4 of the fixed head, there being in this recess 9 tire-gripping wedges or keys 5 that have their serrations inclined oppositely to those on the wedges 5 of the fixed head. Any suitable means may be employed for moving the sliding head 8 toward the fixed head when shrinking a tire, as for instance a lever 11 may be mounted on the frame A to exert a powerful pressure on the movable jaw.

The construction thus far described is a common type of machine and one feature of the present invention is a device B for each head for setting the keys or wedges firmly in gripping relation to the tire. Each device consists of a pair of suitably shaped members or hooks 12 that extend longitudinally over and engage the ends of the wedges on which the device is to operate, and are spaced apart so as to accommodate the felly of a wheel between them. The opposite ends of the wedge-engaging members 12 are united and connect with a ring or eye 14 that is disposed at right angles to the plane in which the members are disposed. Swiveled in the eye 14 is an operating screw 15 that is threaded in an opening 16 provided in a cross bar 17, and on the outer end of this screw is a crank 18. The cross bar 17 for the wedge-setting device on the stationary head is supported by side bars 19 that are bolted to the sides of the stationary head and project outwardly and upwardly therefrom. The bar 17 for the wedge-setting device on the movable head is mounted on parallel bars 20 that are fastened to the movable head and project outwardly and upwardly therefrom, the said bars 20 being bent downwardly on the inner face of the movable head and thence backwardly under the same, as shown in Fig. 2, there being on the top portions of the bars 20 angular stops 21 that depend from the bars and engage the outer face of the movable head so as to firmly secure the bars and movable head together. In turning the crank of either screw to the left or anticlockwise, the members 12 connected therewith will be drawn outwardly so that the wedges will firmly grip on the tire, and by the use of the screw a powerful force can be exerted on the wedges so that their serrations will firmly bite the tire. On the stationary head are fastened spring retainers 22 that are in the form of L-shaped strips that have their vertical members bolted to the sides of the stationary head and their horizontal portions disposed over the members 12 so as to engage therewith and keep the members in proper position. The spring retainers 22 for the wedge-setting devices on the movable head are fastened to the bars 20 and their free ends are shaped to slidably bear on the tops of the members 12 and thus hold the same in the proper position. The movable head is drawn backwardly by means of a treadle 23 that is fulcrumed at 24 on the side of the machine, and this treadle is connected by a link 25, that includes a turn buckle 26, with a lever 27 fulcrumed at 28 at the inside of the plate 7 to which the treadle is attached, the link being connected with the lower end of the lever 27. The upper end of the lever is connected by a rod 29 with one of the bars 20, the connection being effected by the same bolt 30 that connects the angular stop 21 to such bar. When the slidable head is moved inwardly, the treadle is raised, and by pressing down on the treadle, the movable head will be drawn backwardly.

In operating the machine, the movable head will be adjusted away from the fixed head the desired distance, and then the wheel on which the tire is to be shrunk is placed over both heads of the machine and set in the recesses 3 and 8 of the heads, and between the wedges thereof. The cranks for the screws 15 are now turned in a direction to grip the wedges with the tire, and after thus firmly setting the wedges, the operating or upsetting lever 11 is manipulated so as to slide the movable head toward the fixed head and thereby shrink the tire. The cranks of the screws are now turned in the opposite direction so as to release the wedges from the tire, and after this is done, the movable head is drawn backwardly by depressing the treadle.

The wheel is clamped on the fixed head by means of a transverse bar 31 which is fulcrumed at 32 on a post fastened to the rear side of the machine, and on this bar is fastened a block 33 that is faced at its bottom with leather or other material 34 so as to grip the felly of the wheel without marring the same. The front end of the bar or lever 31 is connected with a vertically-extending actuating rod or member 35 that moves vertically through a guide 36 fastened to the side of the frame A at the middle thereof and is provided with a loop or yoke 37 through which the front end of the lever 31 extends. The lower end of this rod 35 is hingedly connected at 38 with a clamping lever 39 which has its rear end beveled to a point to engage any one of a set of vertical teeth 40 on a bar fastened to the frame A. Hingedly connected with the rod 35 is a locking pawl 41 that has its free end 42 so arranged as to engage ratchet teeth 43 on the clamping lever 39. This construction of the wheel-clamping device is well known but the pawl 41 is modified by making it of two parts $a$ and $b$ that are hingedly connected together at 44 so that the pawl is formed with a jointed member which can be collapsed or straightened when the same is to unlock or lock the clamping lever 39. On the part $b$ are two stops or surfaces 45 and 46, and these are so arranged that when the parts of the pawl are straightened or collapsed, the portions 47 and 48 of the part $a$ will engage the said stops or surfaces, respectively. When the pawl is collapsed or broken, its free end will not engage the ratchet teeth 43, but when the parts of the pawl are straightened the free end of the pawl will interlock with one of the ratchet teeth. By constructing the pawl in this manner, it adapts itself to be manipulated by the treadle of the wheel-holding device now to be described.

The wheel-holding device consists of a vertically-movable support or standard 49 that consists of two sections C and D telescopically connected, the section D being a tube fastened on the frame A, while the section C is slidable in the section D. The two sections are of non-circular cross-section so as to prevent relative turning. On the upper end of the movable section of the standard is hinged a swinging member 50 that is adapted to assume an upright position, but is capable of swinging outwardly to a horizontal position, there being an abutment 51 on the standard 49 to prevent the member 50 from swinging inwardly from the vertical position. This member 50 carries an arm 53 disposed at right angles thereto, and on this arm is pivoted a swinging spindle 54 which can be inserted in the hub of a wheel to be operated on, and for wheels of different sizes, tubular pieces may be applied to or removed from the spindle to change the diameter thereof. The arm 53 is vertically adjustable on the member 50 by the latter being provided with a slot 55 through which a clamping bolt 56 extends for securing the arm 53 to the said member. To provide for quick clamping and unclamping of the arm, a wedge-shaped block 57 is applied to the bolt, and between this block and member 50 is a rotary wedge or cam 58 that has a handle 59, so that by swinging the handle up or down, the parts can be readily tightened or loosened. The pivoted end of the spindle has a rounded surface 60 that is struck from a center eccentric to the pivot 61 by which the spindle is connected with the arm 53, and on the arm is an abutment or surface 62 with which different portions of the surface 60 engage so as to permit the spindle to have a swinging movement of about forty-five degrees. When the wheel-holding device is open so as to receive a wheel or to permit one to be taken off the spindle, the member 50 will extend outwardly from the machine, the arm 53 upwardly, and the spindle at an inclination of about forty-five degrees. Assuming that a wheel has been placed on the spindle, the member 50 is swung upwardly and in doing this the spindle will gravitate to a horizontal position and bring the wheel in coöperative relation with the wedges of the machine. If the radius of the wheel is such that it does not set properly in the machine, the movable section C of the standard 49 is raised or lowered, as required. This raising and lowering of the standard section C is accomplished by a treadle 63 fulcrumed on a bracket 64 secured to the lower end of the section D of the standard. The non-circular stem portion of the section C is long enough to project out of the bottom of the tubular section D and the treadle is operatively connected with the lower end 66 of the part C engages. Hence, by pressing down on the treadle, the standard can be increased in length, the downward movement of the treadle being limited by a stop 67 fixed on the bracket 64. The treadle 63 is connected with a chain 68 which passes over an idler sprocket 69 mounted on a bracket 70 secured to the standard 49, and the end of this chain opposite from the treadle is connected with the lever 39 so that after the pawl 41 is collapsed, the treadle 63 can be pressed downwardly to permit the wheel-clamping bar to be released and at the same time the wheel to be raised out of the machine, and after it is thus raised, the member 50 is swung downwardly so as to carry the wheel to one side of the machine where it can be conveniently taken off the spindle.

Referring to the modification in Fig. 7, the clamping bar 31ᵃ is provided with a longitudinal slot 75 which extends from a point close to the rear end to approximately the middle of the bar, and the post or standard 76 at the rear of the machine extends through this slot so that the rear part of the bar will be held in place when clamping the felly of the wheel. The loop or yoke 37ᵃ, which is pivoted on the upper end of the rod 35, has a handle 77 whereby the loop or yoke can be readily engaged with or disengaged from the clamping bar 31ᵃ. On the yoke is a stop 78 which is adapted to engage the rod 35 when the loop or yoke is thrown to releasing position, as shown by dotted lines. When the clamping bar 31ᵃ is released, it can be pushed rearwardly and at the same time swung upwardly so that it will come to rest on the dotted line position with the upper or front end of the bar into the rear of the wheel and the wheel can be turned around to upset another portion of the tire. On the bar is pivoted a clamping block 79 for gripping the felly of the wheel, the said block having an opening 80 into which the ends of a strip of leather 81 can be inserted, the leather passing under the block so as not to mar the wood of the wheel. This leather can be fastened in place by means of a wedge 82 inserted in the opening 81 to hold the overlapping ends of the leather together. The post or standard 76 has openings 83 in any one of which a pin 84 can be inserted to extend across the rear end of the bar 31ᵃ. This pin prevents the rear bar from moving upwardly on the post, when a downward pressure is imparted to the front end of the bar to clamp the wheel in the machine. At the base of the post 76 is an inclined surface or seat 85 on which the clamping bar rests when it is in open position, as shown by dotted lines, Fig. 7, so that it will be in a position readily accessible from the front side of the machine, when it is to be again engaged with the wheel felly.

In Fig. 8, the clamping cam 58ᵃ for the wheel-holding device C bears on the outer face of a plate 86 which is slidable on the member 50, so that by swinging the cam, it will ride on the plate 86 and cause the parts 50 and 53 to be clamped together substantially similar to the action of the cam 58, Figs. 1 and 3.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. In a tire shrinking machine, a wheel-holding device, said device comprising a vertically-extensible standard, a swinging member on the standard, means on the standard for supporting the member in a horizontal or vertical position, an arm extending from the member and adjustable along the latter, and a spindle hingedly mounted on the outer end of the arm.

2. In a tire shrinking machine, a wheel-holding device, said device comprising a vertically-extensible standard, a swinging member on the standard, means on the standard for supporting the member in a horizontal or vertical position, an arm extending from the member and adjustable along the latter, a spindle hingedly mounted on the outer end of the arm, means for clamping the arm on the member, and means for limiting the swinging movement of the spindle.

3. An attachment for tire-shrinking machines comprising a vertically-adjustable wheel supporting device for holding wheels of different sizes in upright position, a clamping device for engaging the felly of the wheel, and a connection between the said devices for opening the clamping device while the first-mentioned device is operated to raise the wheel out of the machine.

4. An attachment for tire shrinking machines comprising a wheel holder including a treadle for adjusting the holder for wheels of different diameters, a clamping bar extending across the felly of the wheel for holding the latter in the machine in coöperative relation with the said devices, a lever for operating the bar, a pawl for holding the lever in clamping position and releasable therefrom, and an operating connection between the treadle and lever for raising the latter upon depression of the treadle after the pawl is released.

5. An attachment for tire shrinking machines comprising a wheel holder including a treadle for adjusting the holder for of different diameters, a clamping bar extending across the felly of the wheel for holding the latter in the machine in coöperative relation with the said devices, a lever for operating the bar, a pawl for holding the lever in clamping position and releasable therefrom, an operating connection between the treadle and lever for raising the latter upon depression of the treadle after the pawl is released, said operating connection including a flexible element connected with the treadle and lever, and a guide over which the element passes.

In testimony whereof I affix my signature in presence of two witnesses.

LOUIS H. BURCHETT.

Witnesses:
A. E. FORD,
F. E. RAMSIER.